(12) United States Patent
Wang et al.

(10) Patent No.: US 11,298,877 B2
(45) Date of Patent: Apr. 12, 2022

(54) VARIABLE-SIZE FULLY-AUTOMATIC 3D PRINTING SYSTEM BASED ON CYLINDRICAL COORDINATE SYSTEM

(71) Applicant: Xi'an University of Technology, Xi'an (CN)

(72) Inventors: Gengxiang Wang, Xi'an (CN); Pengfei Li, Xi'an (CN); Kaihe Wei, Xi'an (CN)

(73) Assignee: XI'AN UNIVERSITY OF TECHNOLOGY, Xi'an (CN)

(*) Notice: Subject to any disclaimer, the term of this patent is extended or adjusted under 35 U.S.C. 154(b) by 147 days.

(21) Appl. No.: 16/669,602

(22) Filed: Oct. 31, 2019

(65) Prior Publication Data

US 2020/0070418 A1  Mar. 5, 2020

(30) Foreign Application Priority Data

May 5, 2019 (CN) .......................... 201910367608.0

(51) Int. Cl.
*B29C 64/245* (2017.01)
*B29C 64/209* (2017.01)
*B29C 64/227* (2017.01)
*B33Y 30/00* (2015.01)

(52) U.S. Cl.
CPC .......... *B29C 64/245* (2017.08); *B29C 64/209* (2017.08); *B29C 64/227* (2017.08); *B33Y 30/00* (2014.12)

(58) Field of Classification Search
CPC ... B29C 64/245; B29C 64/209; B29C 64/227; B29C 64/20; B33Y 30/00
See application file for complete search history.

(56) References Cited

U.S. PATENT DOCUMENTS

| 2011/0089610 | A1* | 4/2011 | El-Siblani | B29C 64/129 264/401 |
| 2011/0215506 | A1* | 9/2011 | Okamoto | B29C 35/08 264/401 |
| 2017/0080641 | A1* | 3/2017 | El-Siblani | B33Y 10/00 |
| 2017/0371317 | A1* | 12/2017 | Share | B29C 64/393 |
| 2018/0050499 | A1* | 2/2018 | Makover | B29C 64/241 |
| 2020/0147877 | A1* | 5/2020 | Lee | B29C 64/209 |
| 2020/0290276 | A1* | 9/2020 | Kunc | B33Y 10/00 |

* cited by examiner

*Primary Examiner* — Seyed Masoud Malekzadeh
(74) *Attorney, Agent, or Firm* — Maier & Maier, PLLC

(57) ABSTRACT

A variable-size fully-automatic 3D printing system based on a cylindrical coordinate system includes a base provided with a retractable work platform; the base is provided with a vertical support side plate on a side thereof; an upper end of the support side plate is connected to a top plate, and the top plate is located directly above the base; a lower side of the top plate is connected to a sleeve via a column seat; a lower end of the sleeve is provided with a protrusion; a lower end of the protrusion is connected with a cross beam; a lower side of the cross beam is provided with a ball screw a, one end of the ball screw a is connected to a power end of a first servo motor disposed at an outer end of the cross beam.

6 Claims, 5 Drawing Sheets

VARIABLE-SIZE FULLY-AUTOMATIC 3D PRINTING SYSTEM BASED ON CYLINDRICAL COORDINATE SYSTEM

FIELD

The disclosure belongs to the technical field of 3D printers, and in particular to a variable-size fully-automatic 3D printing system based on a cylindrical coordinate system.

BACKGROUND

At present, a working structure of a conventional 3D printer is mostly an orthogonal structure in a three-dimensional space based on the Cartesian coordinate system, and the entire printed part is machined by layer-by-layer printing. In other words, the nozzle of the conventional 3D printer is based on the linear motion to print the part in 3D space no matter what the geometrical shape of the part. Namely, it just moves along the slope of the curve when printing the part with complex surface. In addition, the movement errors of the nozzle relative to the three coordinate axes are directly accumulated. The aforementioned two factors directly affects the printing accuracy and surface roughness of the printed part. Therefore, the mechanical structure and motion form of the conventional 3D printer are destined to be low efficiency and accuracy in printing a part with complicated geometrical curve, especially the rotating part.

SUMMARY

In order to achieve the above object, an object of the disclosure is to provide a variable-size fully-automatic 3D printing system based on a cylindrical coordinate system. The printing system adopts a cylindrical coordinate system structure which is completely different from a Cartesian coordinate system of a conventional 3D printer. This novel printing system includes three joints that are two prismatic joints and one revolute joint to accomplish the three-dimensional printing movement, in which one revolute joint corresponds to the polar angle, two prismatic joints correspond to the polar radius and height, respectively. Therefore, the movement type of a nozzle of the novel printing system is more simple and direct, which is good at printing the rotating part because it uses the polar angle movement to print the circular arc rather than using the tangent line of the circular arc to approximate the arc. Moreover, in order to adapt the size change of the printed part, this novel printing system adopts a retractable printing work platform that can automatically adjust the size of the printing platform according to different specifications of printed parts and improve the practicality and economy of the printing system.

In order to achieve the above object, a technical scheme adopted by the disclosure is a variable-size fully-automatic 3D printing system based on a cylindrical coordinate system. The printing system comprises a base and a retractable work platform; the base is provided with a vertical support side plate on a side thereof; an upper end of the support side plate is connected to a top plate, and the top plate is located directly above the base; a lower side of the top plate is connected to a sleeve via a column seat; a lower end of the sleeve is provided with a protrusion; a lower end of the protrusion is connected with a cross beam; a lower side of the cross beam is provided with a ball screw a, one end of the ball screw a is connected to a power end of a first servo motor disposed at an outer end of the cross beam, and the other end of the ball screw a is connected to a ball screw seat a disposed within a sliding block; a nozzle is slidably connected to a cylindrical guide track a via the sliding block; each side of the ball screw a is provided with the cylindrical guide track a; the sliding block is further connected to the ball screw a and driven by the ball screw a.

The retractable work platform comprises a cylindrical retractable platform seat, an inner wall of the retractable platform seat is fixed with 12 sets of cylindrical guide tracks b facing the center of a circle; a center of the retractable platform seat is provided with a rotary table, and a central hole of the rotary table is provided with a lifting platform; a sloping guide track is disposed on a lower side of the spaced cylindrical guide track b; a transmission rod is disposed between an inner bottom surface of the retractable platform seat and the bottom of a sliding block plate; a clamping block plate is located between the two sliding block plates when the retractable work platform is extended, and the sliding block plate acts as a top platform surface of the retractable work platform when the retractable work platform is retracted, the clamping block seat is located under the clamping block plate; the rotary table is connected to a second servo motor and rotated under the drive of the second servo motor.

The printing process based on the cylindrical coordinate system of the disclosure is as follows: the diameter of the printing platform can be adjusted according to the size of a printed part, and a nozzle driven by a first motor is moved along polar radius on a guide rail, and the guide rail fixed to a protrusion performs a polar angle movement about Z-axis under the drive of a second motor, while the protrusion driven by a third motor performs a longitudinal movement along the Z-axis, thereby completing the 3D printing process.

The top of an inner cavity of the column seat is provided with a servo motor b, and the servo motor b is fixed in a mouth of the inner cavity of the column seat via a connection plate; a power end of the servo motor b is connected to an internal gear; the internal gear is connected to the sleeve via an internal gear spline; an upper segment of the sleeve is nested in the inner cavity of the column seat; the inner cavity of the column seat on a lower side of the internal gear is provided with a servo motor c, a power end of the servo motor c is connected to the ball screw base b via a coupling, and the ball screw base b is connected to an upper end of the ball screw b; a lower end of the ball screw b is connected to the ball screw base c; the coupling is fixed to an upper end of a cavity of the protrusion via a circular baffle and a fastening screw b; the protrusion is disposed in the inner cavity of the sleeve; the servo motor c is connected with a coupling key of the coupling.

The internal gear is provided with a planetary gear carrier and the planetary gear carrier is provided with three planetary gears thereon; the three planetary gears engage with a sun gear.

A support rib is disposed between the top plate and the side plate.

The printed part is placed on the upper side of the retractable work platform.

A top plate platform is disposed between the top plate and the column seat; the column seat is fixed to the top plate platform by a fastening screw a.

The protrusion has a square cross section.

Compared with the prior art, the beneficial effects of the disclosure are:

1) The innovation of the variable-size fully-automatic 3D printing system based on the cylindrical coordinate system is that it adopts a 3D printing principle completely different from the traditional 3D printing system and its printing method is based on the movement of the cylindrical coordinate system, and the structure completely subverts the printing structure of the traditional 3D printer in which a Cartesian coordinate system is adopted, and not only realizes all the functions of the traditional 3D printer, but also suits for printing the rotating part specially.

2) The platform for printed parts adopts a printing work platform with an automatically variable radial size, thereby avoiding the printing size limitation defect of the conventional 3D printer. The structure can appropriately adjust the printing range according to different printed objects; Additionally, since the structure of the printer is simple and compact, the reconfigurability of the structure can be easily realized, that is, the overall printing range can be changed by replacing the system components, realizing the multi-purpose function with one machine and facilitating further commercialization of the 3D printer.

The disclosure employs two moving devices (moving motion mechanism of the nozzle along the diameter direction of the printing platform and moving movement mechanism of the nozzle along the vertical direction), and a rotating device (the cross beam with the nozzle moving mechanism as a whole rotates about the vertical direction) and the retractable work platform that assists in automatically adjusting the radial printing size; wherein the rotating device corresponds to the polar angle of the cylindrical coordinate system, and the moving device corresponds to the radial movement of the cylindrical coordinate system and the longitudinal movement of the space. The auxiliary moving mechanism is a circular working platform that is radially retractable and is used for automatically adjusting the printing size according to printed parts, thereby improving the application range and economy of the printer. In addition, the main mechanical structure of the fully-automatic 3D printing system based on the cylindrical coordinate system is more simple, compact and flexible than the traditional 3D printing system.

Figure 1:
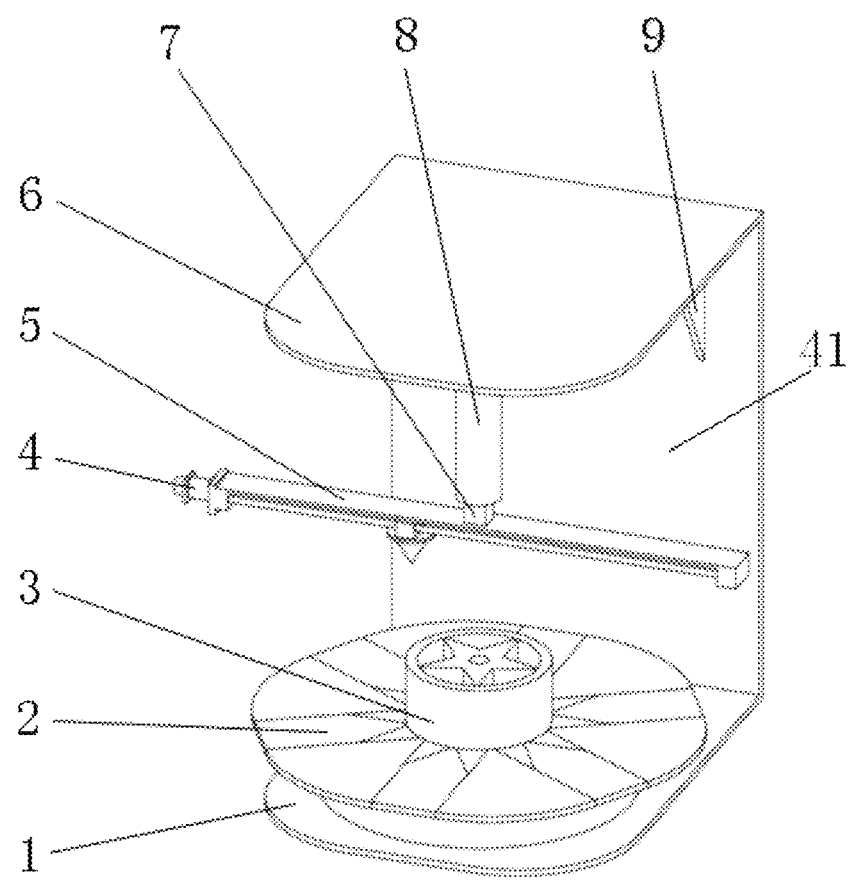
FIG. 1 is a schematic structural view (I) of the disclosure.
Figure 2:
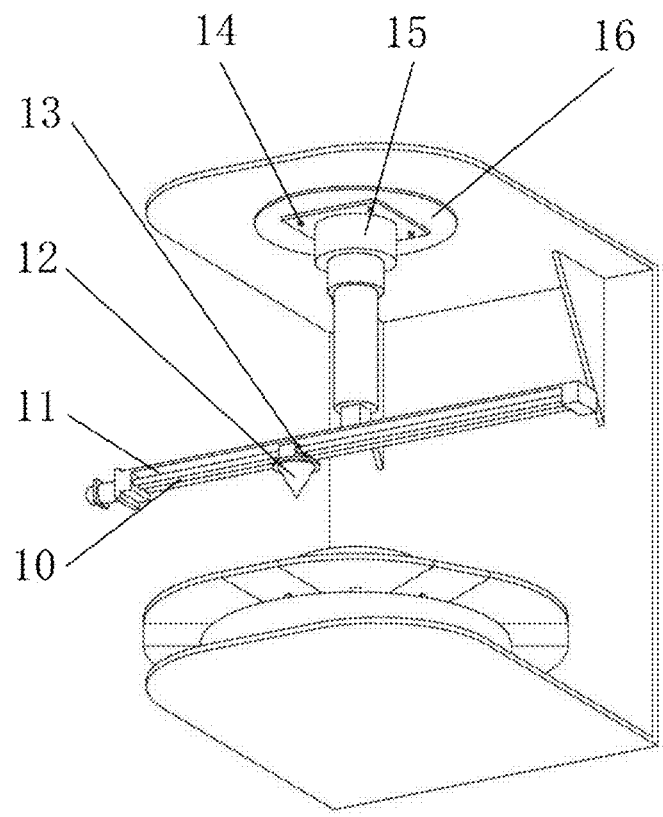
FIG. 2 is a schematic structural view (II) of the disclosure.
Figure 3:
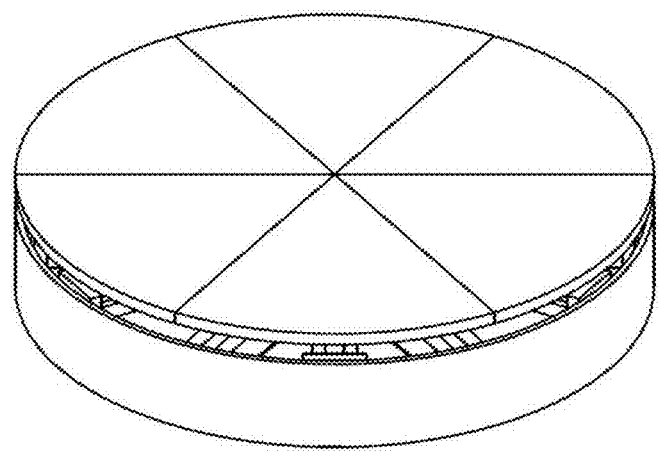
FIG. 3 is a schematic structural view of a retractable printing work platform of the disclosure in a retractable state.

In the drawings: 1. base, 2. retractable work platform, 3. printed part, 4. servo motor a, 5. cross beam, 6. top plate, 7. protrusion, 8. sleeve, 9. support rib, 10. ball screw a, 11. cylindrical guide track a, 12. nozzle, 13. ball screw seat a, 14. fastening screw a, 15. column seat, 16. top plate platform, 17. sloping guide track, 18. retractable platform seat, 19. cylindrical guide track b, 20. rotary table, 21. transmission rod, 22. clamping block plate, 23. sliding block plate, 24. clamping block seat, 25. lifting platform, 26. connection plate, 27. servo motor b, 28. internal gear, 29. sun gear, 30. coupling, 31. ball screw seat b, 32. ball screw b, 33. ball screw seat c, 34. planetary gear, 35. servo motor c, 36. fastening screw b, 37. coupling key, 38. planetary gear carrier, 39. internal gear spline, 40. rotating platform sloping guide track, 41. support side plate.

DETAILED DESCRIPTION

The disclosure will be described below in detail with reference to the accompanying drawings.

With reference to FIGS. 1-9, a variable-size fully-automatic 3D printing system based on a cylindrical coordinate system of the disclosure comprises a base 1, a retractable work platform 2, a printed part 3, a servo motor 4, a cross beam 5, a top plate 6, a protrusion 7, a sleeve 8, a support rib 9, a ball screw a 10, a cylindrical guide track a 11, a nozzle 12, a ball screw seat a 13, a fastening screw a 14, a column seat 15, a top plate platform 16, a sloping guide track 17, a retractable platform seat 18, a cylindrical guide track b 19, a rotary table 20, a transmission rod 21, a clamping block plate 22, a sliding block plate 23, a clamping block seat 24, a lifting platform 25, a connection plate 26, a servo motor b 27, an internal gear 28, a sun gear 29, a coupling 30, a ball screw seat b 31, a ball screw b 32, a ball screw seat c 33, a planetary gear 34, a servo motor c 35, a fastening screw b 36, a coupling key 37, a planetary gear carrier 38 and an internal gear spline 39.

A variable-size fully-automatic 3D printing system based on a cylindrical coordinate system comprises a base 1, the base 1 is provided with a retractable work platform 2; the base 1 is provided with a vertical support side plate 41 on a side thereof; an upper end of the support side plate 41 is connected to a top plate 6, and the top plate 6 is located directly above the base 1; a lower side of the top plate 6 is connected to a sleeve 8 via a column seat 15; a lower end of the sleeve 8 is provided with a protrusion 7; a lower end of the protrusion 7 is connected with a cross beam 5; a lower side of the cross beam 5 is provided with a ball screw a 10, one end of the ball screw a 10 is connected to a power end of a first servo motor 4 disposed at an outer end of the cross beam 5, and the other end of the ball screw a 10 is connected to a ball screw seat a 13 disposed within a sliding block; a nozzle 12 is slidably connected to a cylindrical guide track a 11 via the sliding block; each side of the ball screw a 10 is provided with the cylindrical guide track a 11; the sliding block is further connected to the ball screw a 10 and driven by the ball screw a 10.

Figure 4:
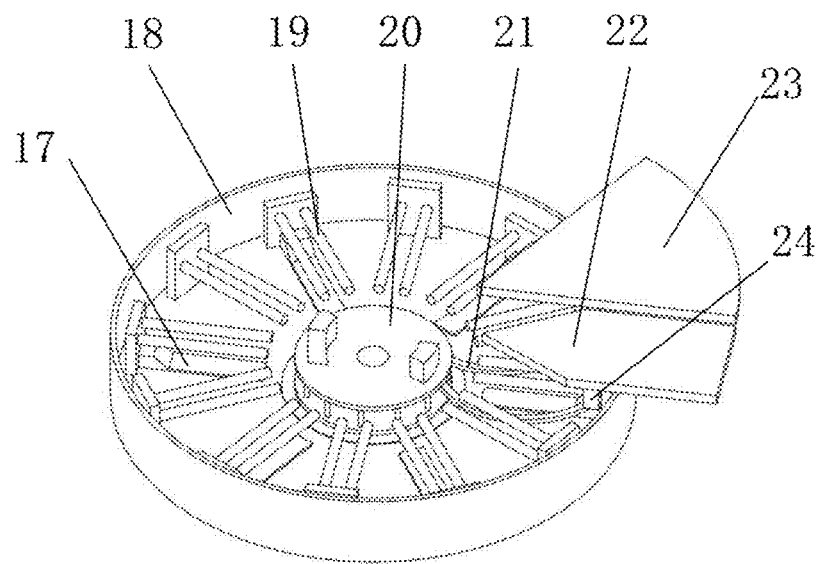
FIG. 4 is a schematic view of an internal structure of a retractable printing work platform of the disclosure.
Figure 5:
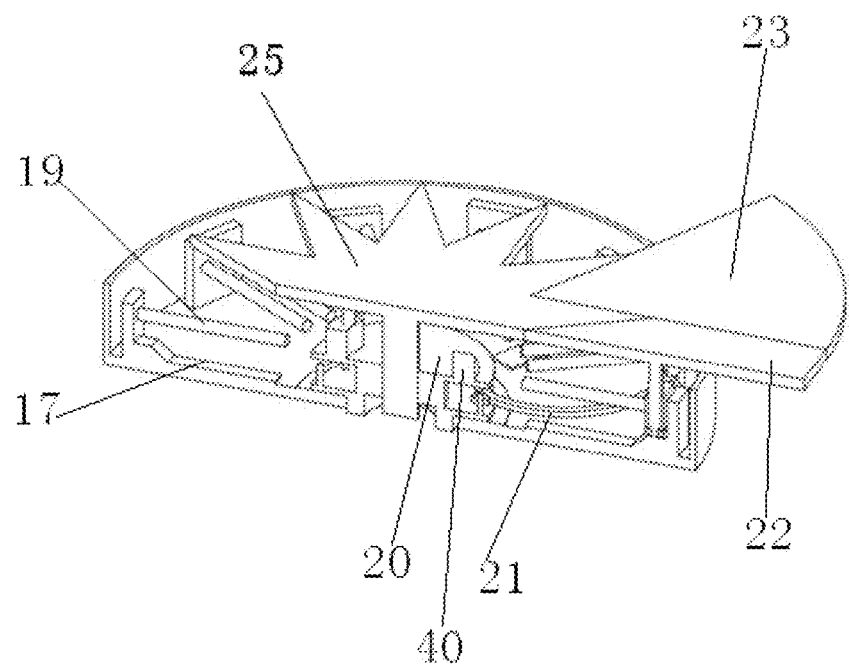
FIG. 5 is a cross sectional view of a retractable printing work platform of the disclosure.

With reference to FIGS. 1, 4 and 5, a retractable work platform 2 includes a cylindrical retractable platform seat 18, and 12 sets of cylindrical guide tracks b 19 facing the center of a circle are fixed on an inner surface of the retractable platform seat 18; a rotary table 20 is disposed at the center of the retractable platform seat 18, and a lifting platform 25 is disposed within a central hole of the rotary table 20; a sloping guide track 17 is disposed at a lower side of the spaced cylindrical guide track b 19; a transmission rod 21 is disposed between an inner bottom surface of the retractable platform seat 18 and the bottom of a sliding block plate 23; a clamping block plate 22 is located between the two sliding block plates 23 when the retractable work platform 2 is extended, and the sliding block plate 23 acts as the top platform surface of the retractable work platform 2 when the retractable work platform 2 is retracted; a clamping block seat 24 is located under the clamping block plate 22; the rotary table 20 is connected to a second servo motor and is driven by the second servo motor; a rotating platform sloping guide track 40 is disposed on the rotary table 20, and the rotating platform sloping guide track 40 serves to cooperate with a ramp on the lifting platform 25 so that the lifting platform 25 exactly reaches a specified height when the rotating platform sloping guide track 40 rotates to a certain angle.

With reference to FIGS. 1, 3, 6 and 8, a servo motor b 27 is disposed on the top of an inner cavity of a column seat 15 and fixed to a mouth of the inner cavity of the column seat 15 via a connection plate 26; an power end of the servo motor b 27 is connected to an internal gear 28; the internal gear 28 is connected to a sleeve 8 via an internal gear spline 39; an upper segment of the sleeve 8 is nested in the inner cavity of the column seat 15; a servo motor c 35 is disposed within an inner cavity of the column seat 15 on the lower side of the internal gear 28, and a power end of the servo motor c 35 is connected to a ball screw base b 31 via a coupling 30, and the ball screw base b 31 is connected to an upper end of the ball screw b 32; a lower end of the ball screw b 32 is connected to a ball screw base c 33; the coupling 30 is fixed to an upper end of a cavity of a protrusion 7 via a circular baffle and a fastening screw b 36; the protrusion 7 is disposed in an inner cavity of the sleeve 8; the servo motor c 35 is connected with a coupling key 37 of the coupling 30.

A planetary gear carrier 38 is disposed in the internal gear 28, and three planetary gears 34 are disposed on the planetary gear carrier 38; the three planetary gears 34 engage with a sun gear 29.

A support rib 9 is disposed between a top plate 6 and a side plate.

A printed part 3 is placed on an upper side of the retractable work platform 2.

A top plate platform 16 is disposed between the top plate and the column seat 15; the column seat 15 is fixed to the top plate platform 16 via a fastening screw a 14.

Figure 6:
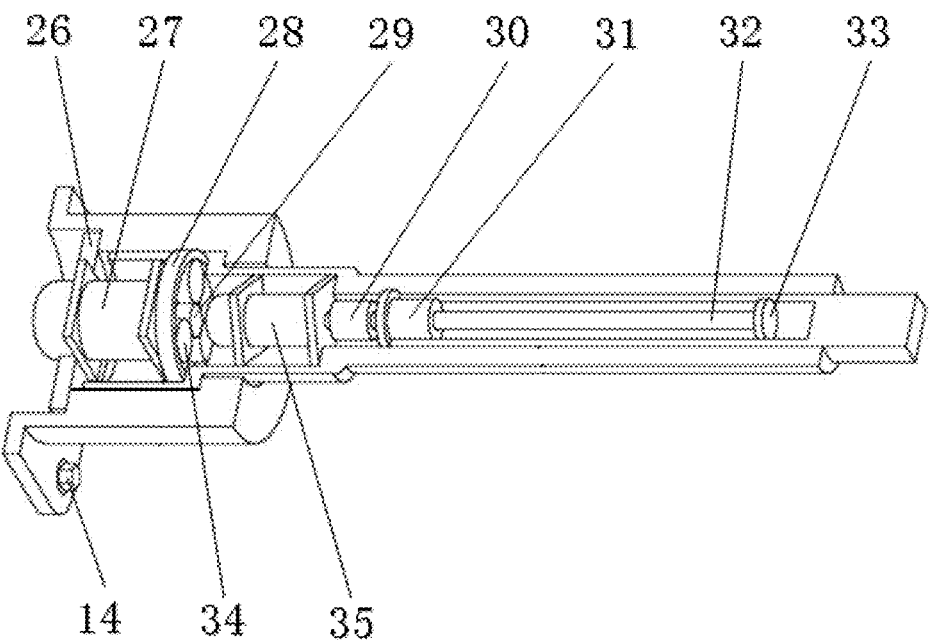
FIG. 6 is a schematic view of an internal structure of a column of the disclosure.
Figure 7:
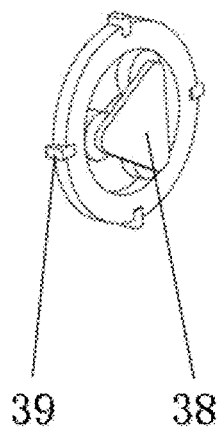
FIG. 7 is a schematic structural view of an internal gear of the disclosure.
Figure 8:
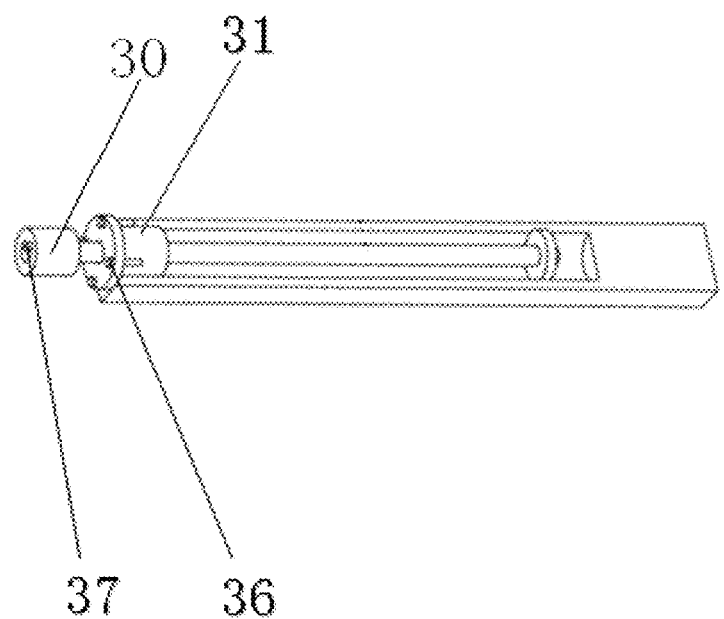
FIG. 8 is a schematic structural view of a column seat, a sleeve, a ball screw seat b, a ball screw b, a ball screw seat c and a protrusion of the disclosure.

With reference to FIGS. 1, 6, and 7, the variable-size fully-automatic 3D printing system based on the cylindrical coordinate system is driven by the servo motor a 4 and is transmitted by the ball screw a 10 so that the ball screw seat 13 moves along the linear guide track a 11 on the cross beam 5, realizing the movement of the nozzle 12 in the Y-axis direction and completing the printing operation of the printed part 3 along the axial direction of the linear guide track a 11; the servo motor c 35 is fixed in the sleeve 8 and is connected to the ball screw b 32 via the coupling key 37 on the coupling 30, and the servo motor c 35 drives the ball screw b 32 to rotate. The protrusion 7 has a square structure in cross section, and forms a structure of a moving pair with the sleeve 8, and the ball screw seat 31 is connected to the protrusion 7 via the fastening screw b 36, so that the ball screw seat 31 drives the protrusion 7 to move in the axial direction of the sleeve 8, thereby completing the printing operation of the nozzle in the Z-axis direction; the connection plate 26, the servo motor b 27 and the column seat 15 are firmly connected via the fastening screw, and the servo motor b 27 drives the sun gear 29 to rotate so that the three planetary gears 34 rotates about the sun gear under the constraint of the planetary gear carrier 38, thereby rotating the internal gear 28. The internal gear 28 is connected to the sleeve 8 via the internal gear spline 39, that is, completing the decelerating rotational movement of the sleeve 8 about the Z axis; the column seat 15 is connected to the top plate platform 16 via the fastening screw a 14, and the top platform 16 is a convex plate on the top plate 6. The retractable work platform 2 is mounted on an upper plane of the base 1, and the extending and retracting movement of the platform is controlled by a servo motor.

Figure 9:
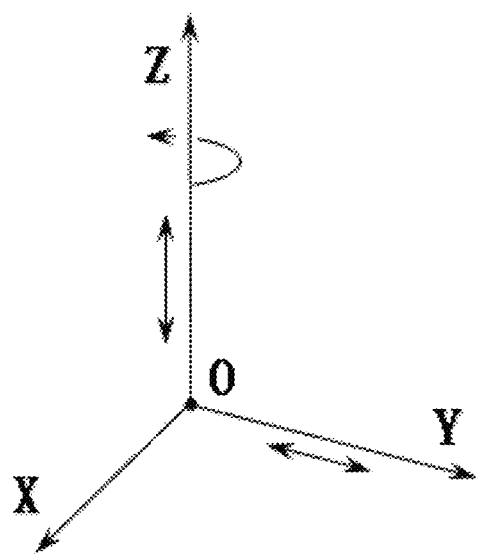
FIG. 9 is a schematic view of the movement of a nozzle 12 along the Y-axis and a sleeve along the Z-axis according to the disclosure.

With reference to FIGS. 1 and 9, the movement of the nozzle 12 in the diameter direction of the retractable work platform 2 is driven by the servo motor a 4, and is transmitted by the ball screw a 10 so that the ball screw seat a 13 moves along the linear guide track a 11 on the cross beam 5, realizing the movement of the nozzle 12 in the Y-axis direction and completing the printing operation of the printed part 3 in the axial direction of the linear guide track a 11;

The rotation of the nozzle 12 about the Z-axis: the servo motor c 35 is fixed in the sleeve 8 and is connected to the ball screw b 32 via the coupling key 37 on the coupling 30, and the servo motor c 35 drives the ball screw b 32 to rotate. The protrusion 7 has a square structure in cross section, and forms a structure of a moving pair with the sleeve 8, and the ball screw seat 31 is connected to the protrusion 7 via the fastening screw b 36, so that the ball screw seat 31 drives the protrusion 7 to move in the axial direction of the sleeve 8, thereby completing the printing operation of the nozzle in the Z-axis direction;

Movement of the nozzle 12 along the Z-axis: the connection plate 26, the servo motor b 27 and the column seat 15 are firmly connected via the fastening screw, and the servo motor b 27 drives the sun gear 29 to rotate so that the three planetary gears 34 rotates about the sun gear under the constraint of the planetary gear carrier 38, thereby rotating the internal gear 28. The internal gear 28 is connected to the sleeve 8 via the internal gear spline 39, that is, completing the decelerating rotational movement of the sleeve 8 about the Z-axis;

The operation of the retractable work platform 2: when the retractable work platform 2 is in the retracted state, the rotary table 20 is rotated clockwise by a servo motor. Due to the presence of the transmission rod 21, both the sliding block plate 23 and the clamping block seat 24 move outward along the cylindrical guide track 19, the clamping block plate 22 engage with the clamping block seat 24 by a moving pair, and the bottom of the clamping block plate 22 forms another moving pair with the sloping guide track 17 under the action of gravity, and when the clamping block seat 24 moves outward to a certain position, the clamping block plate 22 moves upward until an upper plane of the clamping block plate 22 coincides with an upper plane of the sliding block plate 23, while the lifting platform 25 also rises up to a certain distance when the rotary table 20 rotates to a certain angle, and the rotary table 20 continues to rotate, so that the gap between the components of the platform is reduced until the locking is completed, and the extending process of the retractable work platform 2 ends here.

What is claimed is:

1. A variable-size fully-automatic 3D printing system based on a cylindrical coordinate system, comprising: a base, wherein the base is provided with a retractable work platform; the base is provided with a vertical support side plate on a side thereof; an upper end of the support side plate is connected to a top plate, and the top plate is located directly above the base; a lower side of the top plate is connected to a sleeve via a column seat; a lower end of the sleeve is provided with a protrusion; a lower end of the protrusion is connected with a cross beam; a lower side of the cross beam is provided with a ball screw a, one end of the ball screw a is connected to a power end of a first servo motor disposed at an outer end of the cross beam, and the other end of the ball screw a is connected to a ball screw seat a disposed within a sliding block; a nozzle is slidably connected to a cylindrical guide track a via the sliding block; each side of the ball screw a is provided with the cylindrical guide track a; the sliding block is further connected to the ball screw a and driven by the ball screw a, wherein the retractable work platform is configured to be adjusted a size based on a predetermined specification of printed objects, wherein the retractable work platform comprises a cylindrical retractable platform seat, an inner wall of the retractable platform seat is fixed with 12 sets of cylindrical guide tracks b facing the center of a circle; a center of the retractable platform seat is provided with a rotary table, and a central hole of the rotary table is provided with a lifting platform; a sloping guide track is disposed on a lower side of the spaced cylindrical guide track b; a transmission rod is disposed between an inner bottom surface of the retractable platform seat and a bottom of a sliding block plate; a clamping block plate is located between the two sliding block plates when the retractable work platform is extended, and the sliding block plate acts as a top platform surface of the retractable work platform when the retractable work platform is retracted, the clamping block seat is located under the clamping block plate; the rotary table is connected to a second servo motor and rotated under the drive of the second servo motor.

2. The variable-size fully-automatic 3D printing system based on a cylindrical coordinate system according to claim 1, wherein the top of an inner cavity of the column seat is provided with a servo motor b, and the servo motor b is fixed in a mouth of the inner cavity of the column seat via a connection plate; a power end of the servo motor b is connected to an internal gear; the internal gear is connected to the sleeve via an internal gear spline; an upper segment of the sleeve is nested in the inner cavity of the column seat; the inner cavity of the column seat on a lower side of the internal gear is provided with a servo motor c, a power end of the servo motor c is connected to the ball screw base b via a coupling, and the ball screw base b is connected to an upper end of the ball screw b; a lower end of the ball screw b is connected to the ball screw base c; the coupling is fixed to an upper end of a cavity of the protrusion via a circular baffle and a fastening screw b; the protrusion is disposed in the inner cavity of the sleeve; the servo motor c is connected with a coupling key of the coupling.

3. The variable-size fully-automatic 3D printing system based on a cylindrical coordinate system according to claim 2, wherein the internal gear is provided with a planetary gear carrier and the planetary gear carrier is provided with three planetary gears thereon; the three planetary gears engage with a sun gear.

4. The variable-size fully-automatic 3D printing system based on a cylindrical coordinate system according to claim 1, wherein a support rib is disposed between the top plate and the side plate.

5. The variable-size fully-automatic 3D printing system based on a cylindrical coordinate system according to claim 1, wherein a top plate platform is disposed between the top plate and the column seat; the column seat is fixed to the top plate platform by a fastening screw a.

6. The variable-size fully-automatic 3D printing system based on a cylindrical coordinate system according to claim 1, wherein the protrusion has a square cross section.

* * * * *